United States Patent

Reader et al.

[15] 3,704,447
[45] Nov. 28, 1972

[54] REMOTE TO CENTRAL MONITORING SYSTEM UTILIZING AMPLITUDE CODING OF SIGNALS

[72] Inventors: Charles T. Reader, 402 Ivystone Lane, Moorestown, N.J. 08077; John F. Renz, 146 Harding Avenue, Cinnaminson, N.J. 08057

[22] Filed: March 1, 1971

[21] Appl. No.: 119,486

[52] U.S. Cl. .............................. 340/172, 340/213 R
[51] Int. Cl. .......................... G08b 25/00, H04q 5/14
[58] Field of Search......340/213, 409, 416, 172, 150, 340/213.1, 169

[56] References Cited

UNITED STATES PATENTS

| 3,588,828 | 6/1971 | Schulein | 340/169 |
| 3,550,086 | 12/1970 | Ervin | 340/150 |
| 3,518,653 | 6/1970 | Thomas | 340/213.1 |
| 3,050,713 | 8/1962 | Harmon | 340/172 |

*Primary Examiner*—Donald J. Yusko
*Attorney*—Edward M. Farrell

[57] ABSTRACT

A monitoring system includes a plurality of sensing stations for sensing and transmitting signals representing abnormal conditions to a central station through a single channel or line. The central station includes a plurality of detectors responsive to receive signals from the sensing stations and to identify one or more of the stations transmitting the signals.

15 Claims, 6 Drawing Figures

INVENTORS
CHARLES T. READER
JOHN F. RENZ
BY
*Edward M. Farrell*
ATTORNEY

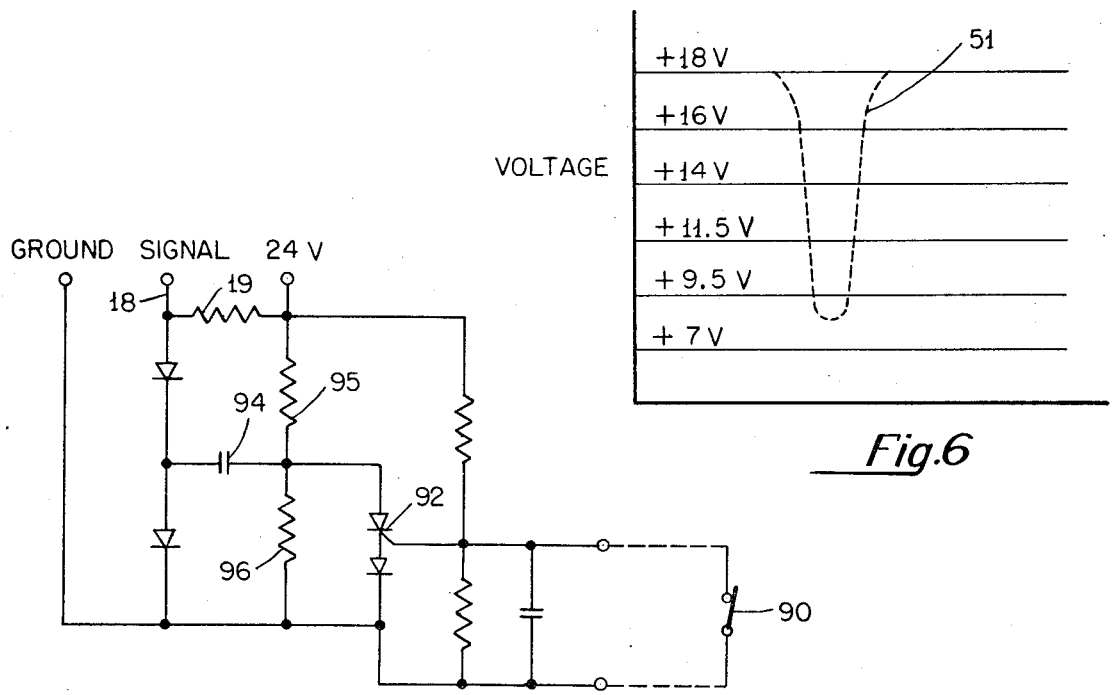
Fig.6
Fig.4
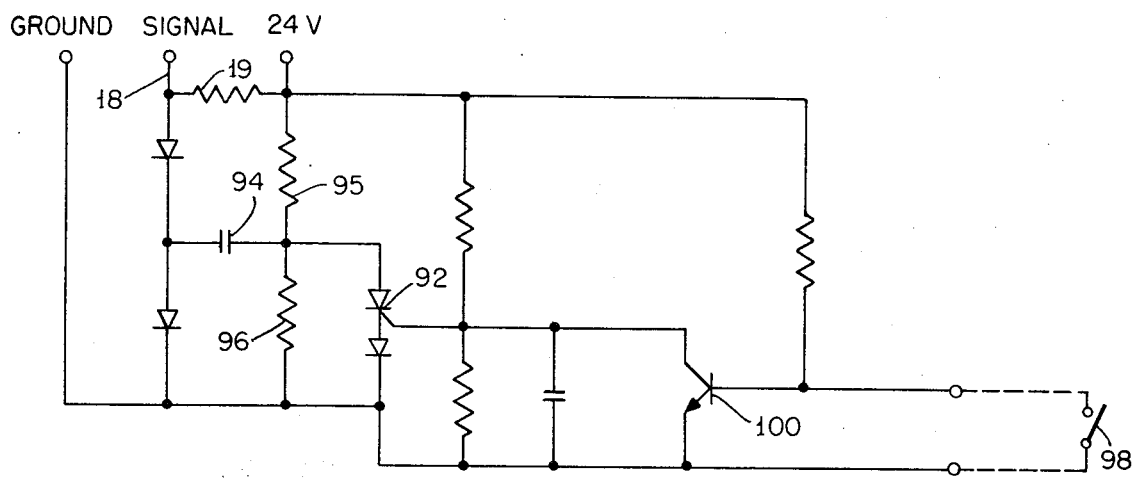
Fig.5
INVENTORS
CHARLES T. READER
BY  JOHN F. RENZ
ATTORNEY

REMOTE TO CENTRAL MONITORING SYSTEM UTILIZING AMPLITUDE CODING OF SIGNALS

Monitoring and annunciator systems involving a plurality of sensing stations for transmitting signals to a central station are well known. Such systems have been used in many industrial control systems wherein operations of various machines are to be monitored. Chemical processes also involve the use of such systems where various conditions, such as moisture content and various chemical actions, must be detected.

Automatic apparatus including electronic alarm and monitoring systems have often involved the selective operation of relays or the like upon the detection of abnormal conditions at stations being monitored. Such relays are often associated with acoustical systems to give an audible warning, bells, recording or measuring devices and sometimes with automatic remedial or correcting apparatus.

Another problem associated with many monitoring systems is that the system is only capable of responding to one condition at one station. After one sensing station has been actuated, a fault in the system will be indicated. However, the system is often rendered non-responsive to subsequent signals from other sensing stations until the system has been reset. When a large number of sensing stations is involved, a system which is non-responsive after the actuation of a single station becomes highly inefficient because a second signal may reflect a more serious abnormal condition than the first which activated the system.

Most monitoring systems which include a large number of sensing stations employ means to identify the particular stations. These identifications are often associated with signals having certain characteristics. For example, the identification may be achieved by the use of coded signals, by the use of voltage signals or by the use of different frequencies. Arrangements involving coded signals have generally tended to require relatively complex and expensive coding and decoding circuitry. Systems involving voltage levels or different frequencies for identification have been limited in their applications because of the tendencies of the signals involved to interfere with each other, especially when two or more sensing stations are actuated.

It is important in many monitoring systems to provide a continuous indication that one of the sensing stations has been actuated without affecting the operations of the other stations. If the central station is unattended for a period of time, it is desirable that the system remember the sensing station actuated without necessarily sounding an alarm immediately.

Another important feature necessary to assure high reliability of a monitoring system relates to its immunity to false or spurious signals.

It is an object of this invention to provide an improved monitoring system which overcomes many of the problems of the prior art mentioned above in a single system.

It is a further object of this invention to provide a novel detector circuit which may be used in a monitoring system, a decoder or other like arrangement.

It is still a further object of this invention to provide an improved monitoring system wherein changes in conditions at more than one of a plurality of sensing stations may be detected and indicated simultaneously.

It is still a further object of this invention to provide an improved monitoring system in which identity of individual stations is provided.

It is still a further object of this invention to provide an improved monitoring system wherein changes in conditions and identification of stations may be obtained with a minimum amount of equipment and circuitry.

It is still a further object of this invention to provide an improved monitoring system in which a condition at one station may be detected without inactivating the other stations in the system.

In accordance with the present invention, a plurality of detector circuits are located at a central control station to pick up signals from a plurality of sensing stations which are transmitted through a single line. Each of the sensing stations is identified with a corresponding one detector circuit at the central control station and responds to a single pulse signal of a predetermined threshold level. Each of the sensing stations generates a single pulse signal of a predetermined amplitude in response to a change in condition. One or more signals from the sensing stations activate corresponding ones of the detector circuits to indicate changes in conditions at one or more of the sensing stations. Only the detector circuit corresponding to the sensing station transmitting the signal is actuated with the other circuits remaining non-responsive to the applied pulse signal or being inhibited by the one actuated detector. Following the actuation of one detector circuit, the system is ready to receive signals from the other sensing stations.

Other objects and advantages of the present invention will be apparent and suggest themselves to those skilled in the art, from a reading of the following specification and claims, in conjunction with the accompanying drawings, in which:

FIGS. 4 and 5 are schematic diagrams of different embodiments of sensing circuits, in accordance with the present invention; and FIG. 6 is a chart illustrating various voltage levels for the circuit illustrated in FIG. 3.

Figure 1:
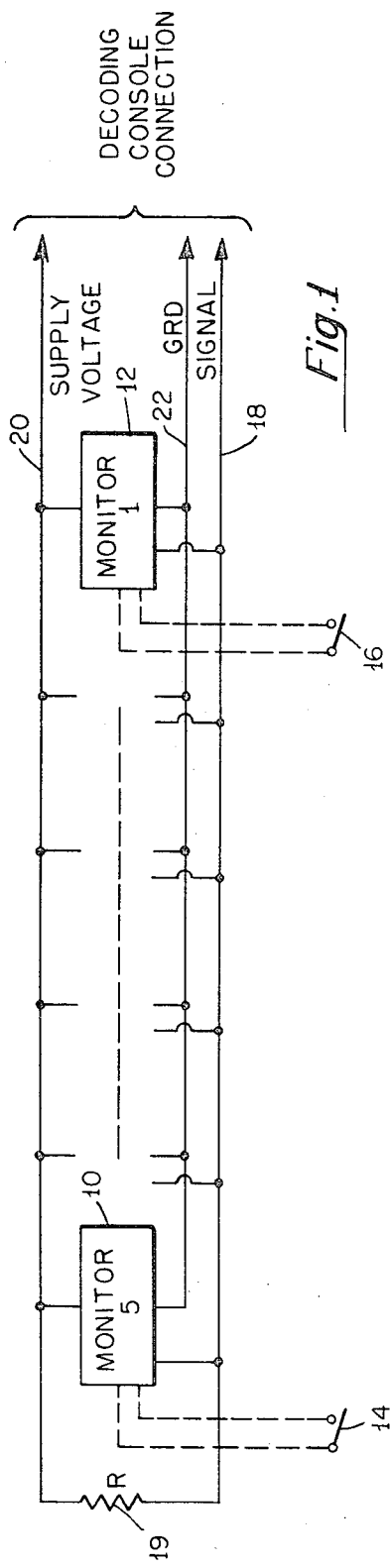
FIG. 1 illustrates a series of sensing stations, partly in block diagram and partly in wiring diagram form, in accordance with the present invention.

Referring particularly to FIG. 1, a plurality of monitoring circuits are located at remote stations. Five circuits are illustrated, it being understood that the actual number may be less than five or greatly in excess of five. Various transducers, not illustrated, may respond to various conditions, such as fire, door openings, etc. and may be of the type to close or open switches when an abnormal condition is sensed. These transducers are well known to those skilled in the art and are only incidentally related to the present invention. The monitor circuits are connected to the central station through three lines, the first being signal line 18, the second being a power supply line 20 and the third being a ground return line 22. When reference to a single line or channel is made, it is understood that reference is made to the signal line.

A plurality of monitoring circuits numbered 1 to 5 is employed with only two being illustrated in the form of blocks 10 and 12. Each of the monitor circuits is associated with the appropriate transducers to actuate switches, such as switches 14 and 16. When abnormal conditions are sensed at any one of the monitor stations, its associated switch is changed from its normal operating state to its opposite state, i.e. from an open condition to a closed condition or from a closed condition to an open condition, dependent on the type of switch used. Actuation of any one of the switches results in a pulse signal being generated by the associated monitor circuit with this pulse being transmitted to a central control station through the signal or surveillance line 18. The pulse is generated as a result of the activation of the monitor circuit by the operation of its associated switch. As will be more fully described in connection with FIGS. 4 and 5, the pulse is generated as a result of the activated monitor being shorted to ground through a common load resistor located at the central control station.

Power is provided for the monitor circuits from the supply voltage line 20 which may be connected to the central control station. A resistor 19 at the end of the signal surveillance line is used to establish a D.C. potential for the signal line. Shorting of the signal line causes a loss of potential on the signal line which indicates a fault or possibly a tamper with the line.

Each monitor circuit, which could be one of the types to be described in connection with FIG. 4 or 5, is assigned a discrete pulse amplitude characteristic. Upon activation, the monitor circuit activated generates a single pulse signal of a unique amplitude with respect to the other monitor circuits.

As will be described, decoding means are connected to the end of the signal or surveillance line 18. The decoding means may be included at a remote point to the sensing stations in a central control station. This decoder is illustrated in FIG. 2.

Figure 2:
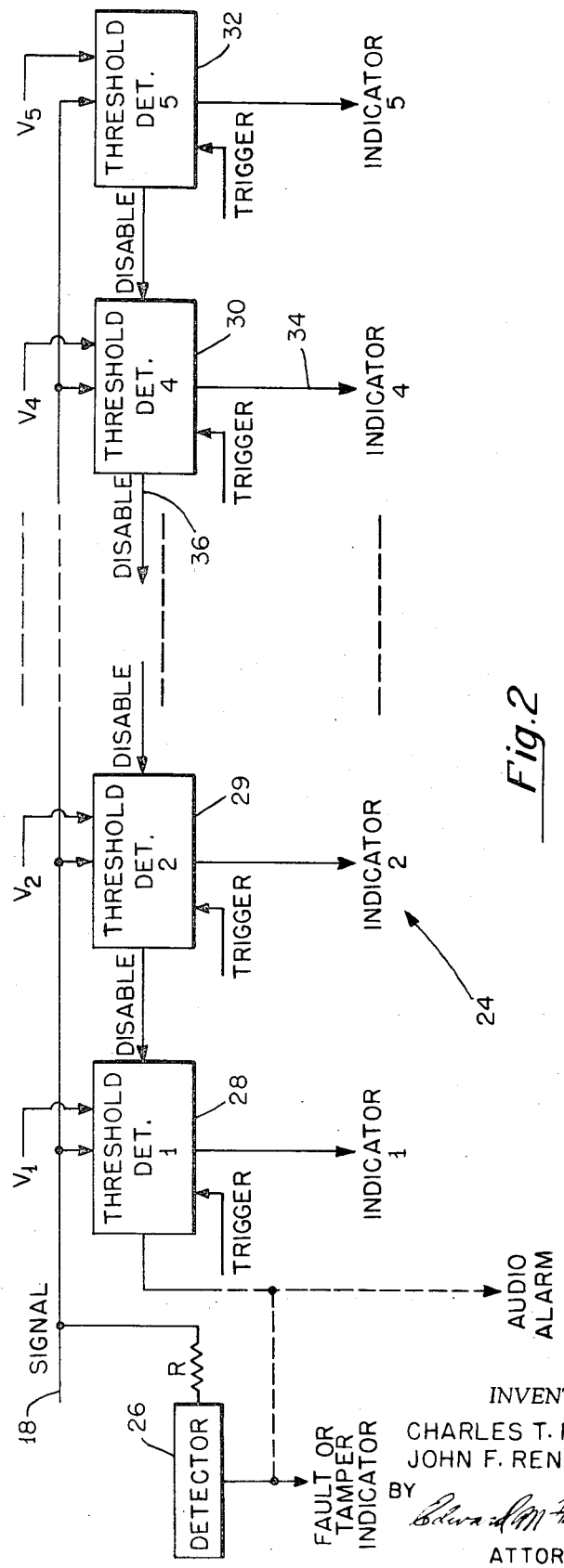
FIG. 2 illustrates a series of detector circuits partly in schematic and partly in block diagram form, in accordance with the present invention.

Referring to FIG. 2, a decoder 24 includes a plurality of threshold level detector circuits numbered 1 to 5 to correspond with the monitoring circuits, such as circuits 10 and 12 of FIG. 1. Only four of the five detector circuits 28, 29, 30 and 32 are illustrated.

The signal line 18 is connected to the input circuits of all the threshold detector circuits. The threshold detector circuits are all biased to different voltage levels, designated as V1 to V5. Each stage is pre-biased to a D.C. voltage slightly less than that level which it is to decode. The lowest rank detector, i.e. circuit 28, may be used to trigger an audible alarm. A detector circuit 26 is used to indicate a fault or tamper with the line.

When a pulse signal is applied to the detector circuits from the line 18, a particular one of the detector circuits corresponding to a particular monitor will become actuated, the particular one being dependent upon the amplitude of the voltage of the applied signal. For example, if the threshold detector circuits have different threshold levels in ascending order from 1 to 5, assume that the level of the applied pulse signal is high enough to trigger detector 30, i.e. number 4. The higher order detector 32, number 5, will not be actuated because the applied signal is too low. The lower order detectors, as will be described, will not be actuated because they will become inhibited.

When the detector 30 is actuated, two output signals are produced, the first to provide an indication that a change in condition has taken place at a monitor and the second signal to provide an inhibit function. The first signal produced at the line 34 actuates an indicator, which could be a lamp, to show that sensing station number 5 has detected a fault or abnormal condition. The second signal, generated at the line 36, disables or inhibits the next lower order detector circuit.

Signals sufficient in amplitude to actuate the number 4 detector would normally be of sufficient amplitude to also actuate the lower order detectors numbered 1 to 3, which have lower threshold levels. However, all of the circuits are cascaded in such a way that the lower order detectors are prevented from being actuated by an inhibit signal generated by the higher order detectors, i.e. if the number 4 detector is actuated it inhibits the number 3 detector, which in turn generates an inhibit signal to inhibit number 2 detector, etc. Inhibit signals are generated down the line from the higher to the lower order detectors to thereby prevent any of the lower order detector circuits from becoming activated.

The pulse signal applied to the detector circuits is of an unknown amplitude when received from a monitor and must be banded by the lower and upper limits by successive bias selection between detector stages.

The detector 28, i.e. number 1, provides noise immunity, since the system is effectively deactivated until amplitudes at least as great or greater than V1 are applied to the decoder circuit. The detector circuit 28 is used to generate an alarm when any one of the detectors is activated. As will be described, the detector circuit 26 detects a fault or tamper with the line in the system.

Figure 3:
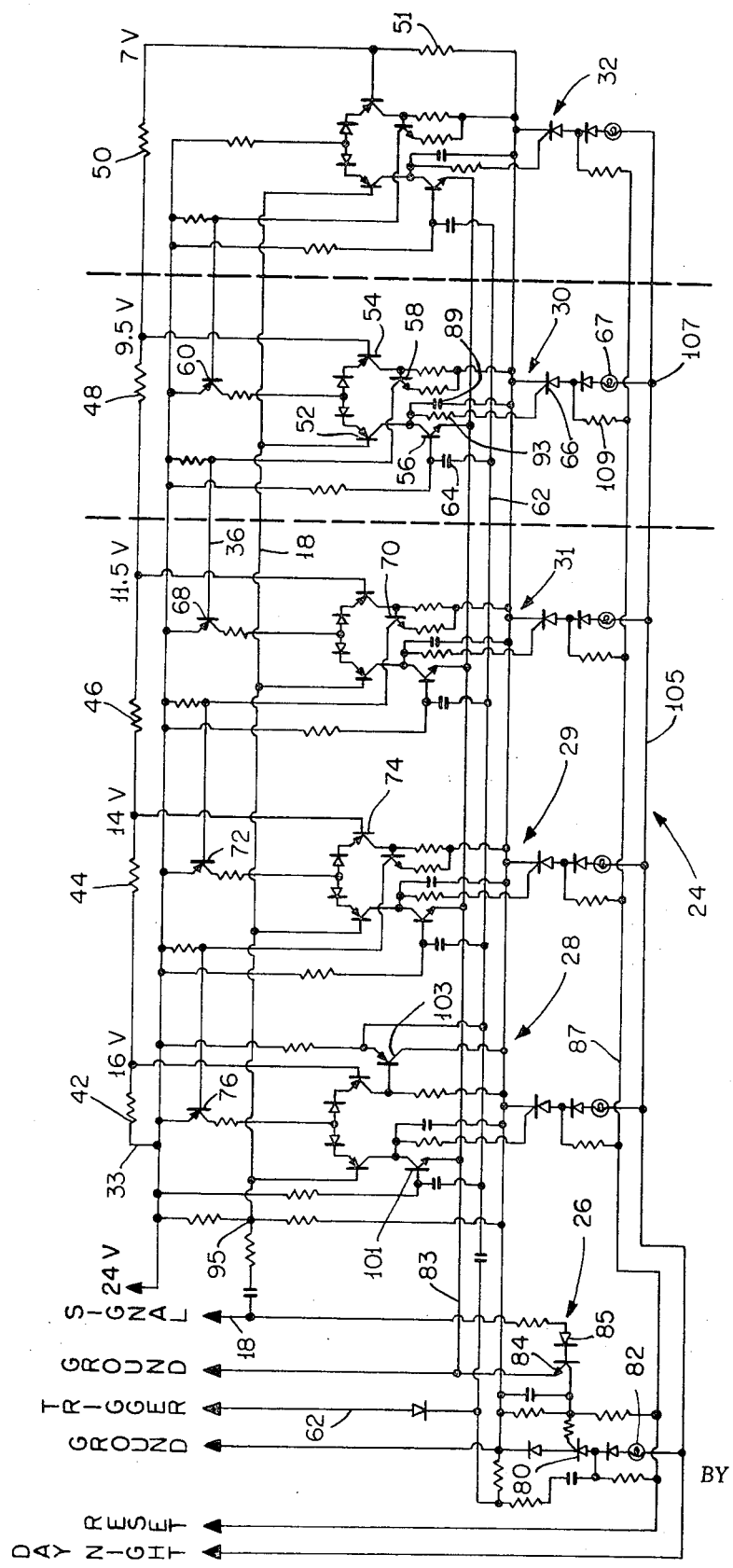
FIG. 3 is a schematic diagram of a detector or decoder circuit, in accordance with the present invention.

Referring particularly to FIG. 3, a complete schematic circuit of the decoder 24 is illustrated, such as the one described in connection with FIG. 2. The decoder 24 includes five decoder circuits 28, 29, 31, 30 and 32 connected in cascade. The various decoder circuits are biased to different voltage levels as indicated by the different values on the bias line 33 to normally maintain the decoder circuits inactivated. The voltage at line 33 may be 24 volts and drop in values in accordance with the voltage drops across resistors 42, 44, 46, 48, 50 and 51, which is returned to ground. Because all of the decoder circuits operate in substantially the same manner, except for the threshold levels at which they become operative, only the operation of the detector circuit 30 will be described in detail.

The threshold detector circuit 30 includes five transistors 52, 54, 56, 58 and 60. The transistors 52 and 54 are of the PNP type and the transistors 56 and 58 are of the NPN type. The fifth transistor 60 is of the PNP type. Of course, it is well known that transistors of the opposite types may be employed with the supply voltages being of opposite polarities.

When inactivated, the transistor 52 is normally nonconducting and the transistor 54 is normally conducting. The transistor 56, which comprises a clamp circuit, is normally heavily conducting. The transistor 58, which comprises a common base circuit, is normally conducting. The transistor 60, which provides the inhibit means when the next higher order detector 32 is activated, is normally conducting.

Consider the operation of transistors 52 and 54 prior to the application of a signal. At this time the voltage at point 95 may, for example, be at 18 volts. The bases of both transistors 52 and 54 are therefore at 18 volts. The bias voltage at the base of transistor 54 is at 9.5 volts. In order for stage 30 to become activated, the voltage of an applied signal must be sufficiently negative with 18 volts being the reference level from which the signal starts. Consequently, in order for the stage 30 to become activated, the negative applied signal must be greater than 8.5 volts, i.e. 18 minus 9.5 volts. This voltage is not enough to operate the stage 32 but is enough to start the activation of the stages 28, 29 and 31, which become inhibited before they become fully activated, as discussed above.

The chart included in FIG. 6 illustrates the various bias levels for the detector circuits. A negative applied signal, illustrated by the dotted lines 51, from one of the sensing stations starts from the 18 volts reference level. Dependent upon the particular sensing station generating the pulse, the signal peaks between the threshold levels of two detector circuits, in the case illustrated, between the detector circuits 30 and 32.

Application of a signal above the threshold level of the detector 30 but lower than the threshold level of the detector 32, from the signal line 18 to the base of the transistor 52, causes the transistor 52 to become conducting. At the same time that a signal is applied to the signal line 18, the trigger line 62 becomes negative. The negative potential at the line 62 across capacitor 64 causes the transistor 56 to cut off. The clamping action of the transistor 56 is therefore momentarily inhibited. The collector of the transistor 56 is connected to the control electrode of the normally non-conducting silicon controlled rectifier SCR 66, causing it to rise. Current through the conducting transistor 52 through capacitor 89 causes a linear voltage rise at the control gate of the SCR 66. When the voltage applied to the SCR 66 reaches a predetermined level, it is switched to a conducting state and an indicator lamp 67 lights. This condition continues until the system is reset and in effect constitutes a memory in the system. The resistor 93 maintains the SCR 66 conductive after the clamp 56 is restored.

At the same time that the transistor 54 is switched to a non-conducting state, its collector voltage drops to ground. Because of the grounding of its base, the transistor 58 is switched from a conducting to a non-conducting state. When the transistor 58 is non-conducting, its collector voltage rises, causing an inhibit signal to be applied to the base of the transistor 68 of the next lower order detector 31. This causes the transistor 68 to become non-conducting, thereby inhibiting the detector stage 31.

At the start of the applied pulse signal from a monitor, all of the lower order detector circuits 31, 29 and 28 start to react in the same manner as the detector circuit 30. The charging capacitor in all of the circuits, such as the capacitor 89, all start to charge. However, they must rise to values above the voltage levels necessary to trigger their associated SCR before any one can become activated to indicate a fault. In operation, the capacitors associated with the lower order detector circuits will not charge long enough to overcome the levels necessary to trigger the SCRs, because the lower order detector stages will be inhibited by inhibit signals from the higher order detectors. Only the proper detector stage activated will have the proper relationship to the applied signal level to become actuated, thereby inhibiting the lower order detectors.

As a result of the transistor 68 becoming non-conducting, the transistor 70 in the next lower order detector stage 31 becomes non-conducting. This causes the transistor 72 in stage 29 to become non-conducting. In like manner, the non-conduction of the transistor 72 causes the transistor 74 to become non-conducting, thereby inhibiting the detector stage 29. The action continues to the next lower order detector stage 28 with the non-conduction of the transistor 74 inhibiting or making transistor 76 of stage 28 non-conducting. Thus, it is seen that all the lower order detector circuits 31, 29 and 28 are inhibited when the stage 30 is activated.

The detector stage 32 remains inactivated because the signal from the signal line 18 is not sufficient to overcome the bias voltage of that stage. Consequently, all the detector stages are inactivated when the detector stage 30 is activated.

All the detector stages operate in substantially the same manner with one being activated and all of the others remaining inactivated. The particular detector circuit activated is dependent upon the applied signal being in the range between its bias level and the bias level of the next higher order detector bias level. For example, an applied signal which overcomes the bias voltages between 9.5 volts and 7 volts will activate the detector circuit 30, a signal voltage level between 16 volts and 14 volts will activate the detector circuit 28, etc.

The detector circuit 28 is the lower order detector circuit. This circuit also starts to become activated upon the application of a signal but still subject to becoming inhibited if its corresponding sensing station does not transmit the signal. However, because it is biased to the highest voltage of all of the detectors, it is used to produce the alarm signal. When a signal is applied to the line 18, the transistor 101 becomes non-conducting and the transistor 103 becomes conducting, as was described in connection with a similar type transistor in the detector circuit 30. When the transistor 103 conducts, an alarm circuit is actuated through the line 62. Of course, if the detector 28 is not the one which is fully activated, it will subsequently become inhibited as a result of the transistor 76 becoming cut-off.

In addition to actuating an alarm circuit, conduction of transistor 103 also generates the trigger signal, which is applied to all of the higher order detectors. Transistors 103, 56 and other transistors corresponding to transistor 56 in the detector circuits, are conducting making the trigger line effectively at ground potential. The trigger line remains at ground potential until the lower order detector 28 is actuated. At this point, the transistors 101, 56 and all other corresponding transistors become non-conducting, allowing the applied pulse to be analyzed in the manner previously described.

The detector circuit 26 is employed to provide a fault or tamper indication. This results in the generation of an alarm at the line 62, the same as if a fault had occurred in one of the sensing stations. An SCR 80 is normally non-conducting with the indicator lamp 82 being out. A clamping transistor 84 is normally conducting. A voltage at the signal line 18 applied to the base of the transistor 84 through a diode 85 maintains the transistor 84 conducting. An opening or closing of the signal line 18 causes the voltage applied from the signal line 18 to the transistor 84 to drop, causing it to become non-conducting. When the transistor 84 becomes non-conducting, its collector voltage rises, causing the SCR 80 to fire, permitting current to flow in the indicator lamp 82 and an alarm to be sounded.

A line 83 is another ground line which is used to check the various indicator lights associated with the threshold level circuits. Closing this line has the same effect as applying a negative voltage to the trigger line 62, causing the SCRs to fire. The SCRs in the threshold circuits start to conduct to light the indicator lights associated therewith. This feature is merely to check the operation of the various lamps. A line 87 is used to reset the system by making all of the SCRs, such as SCR 66, inactivated or non-conducting.

Referring to FIGS. 4 and 5, two circuits which may be used at the sensing stations of FIG. 1, are illustrated. The circuit of FIG. 4 may be used at stations where switches having normally closed contacts are employed, and the circuit of FIG. 5 may be used when switches having normally open contacts are employed.

Referring to FIG. 4, a switch 90 is normally closed and designed to open when abnormal condition is sensed at a sensing station. An SCR 92 is normally non-conducting since the switch 90 normally shorts the control electrode of the SCR 92 to ground.

When the switch 90 opens, the voltage from the power source (24 volts) is applied to the control electrode, causing the SCR 92 to conduct. When the SCR 92 conducts, the capacitor 94 couples a predetermined voltage to the signal line 18. A negative pulse signal of a predetermined amplitude is generated at the signal line and transmitted to the threshold detectors described in connection with FIG. 3. All of the monitor sensing circuits having different values for resistor 96, thereby making it possible to generate pulse signals of different amplitudes.

The circuit if FIG. 5 is substantially the same as of FIG. 4, except that a normally open switch 98 is used. The circuit to the left of transistor 100 operates the same as the circuit of FIG. 4. Transistor 100 is normally conducting and acts as a phase inverter and keeps SCR 94 normally non-conducting. When the switch 98 closes, the transistor 100 becomes non-conducting and the SCR becomes conducting. Again, a negative pulse signal is generated at the signal line for transmission to the threshold level detector circuits at the central control station.

Another feature of the present invention relates to the provision of a day-night operation. It is often desirable at night, when the central control system is operated by a signal from one of the sensing stations, that no audible alarm or visual indication be produced immediately. However, it is desirable that the system "remember" the detector circuit activated. For example, if the system is unattended at night, an attendant may, after coming on duty at the start of the day, switch the system to obtain indications of which stations were actuated during the night. This memory is provided by a switch which permits a voltage to be applied or removed to or from the line 105 producing a voltage at point 107, associated with the indicator light 67, for example. While the SCR 66 is conducting, the indicator lamp will light with voltage applied to the line 107. Current will also flow through the resistor 109. Upon switching the system, the voltage at the line 107 is removed, causing the lamp 67 to extinguish.

It is noted that each detector is activated by a pulse signal having an amplitude within a range of voltages between its bias level and the next higher order detector. Consequently, there are no overlapping voltages between any two detector stages, thereby preventing two detectors from becoming activated by a signal within an overlapping range. Likewise, there is no voltage gap between stages so that an applied signal can never fall within a "dead band".

It is seen that the present invention has provided a novel system wherein a plurality of sensing stations may be serially connected through a single line. A novel decoder circuit responds to a single pulse signal to provide an indication of a fault as well as identifying the station at which the fault occurred. Dead bands and overlapping signal bands are avoided. Memory is provided where no instant indications of alarms are desired.

What is claimed is:

1. In combination, a plurality of sensing devices located at spaced remote stations, said sensing devices being responsive to changes in conditions to generate single pulse amplitude modulated signals of predetermined different amplitudes, each one of said sensing devices being responsive to generate only a single pulse signal of a predetermined amplitude different in amplitude than the amplitudes of all of the others of said sensing devices, a plurality of detector circuits located at a central station, means for biasing said detector circuits to respond to single pulse signals of predetermined different amplitudes, each of said detector circuits being responsive to a single pulse amplitude modulated signal generated by a corresponding one of said sensing devices, a single signal line for transmitting a pulse signal from any one of said sensing devices to said central station to cause a corresponding one of said detector circuits to become activated to indicate a change in condition at a corresponding sensing device while all of the other of said detector circuits are maintained inactivated, and means to enable any one or more of said detector circuits maintained inactivated to become activated by single pulse signals generated to said central station after the activation of said corresponding one of said detector circuits.

2. The invention as set forth in claim 1, wherein said plurality of detector circuits are threshold level detectors normally held activated by different level bias voltages.

3. The invention as set forth in claim 2, wherein said threshold level detectors are operatively connected to each other with the different level bias voltages applied to said detectors progressively varying from one detector to the next detector in ascending order.

4. The invention as set forth in claim 3, wherein the pulse signal applied to said threshold level detectors activates the one of said detectors having the highest bias voltage level below the level of said pulse signal, with all of the other of said detectors remaining inactivated.

5. The invention as set forth in claim 4, wherein the detector activated generates an inhibit signal to prevent the activation of all the detectors having lower bias voltages than the bias voltage of said activated detector, with detectors having higher bias voltages than the applied pulse signal remaining inactivated.

6. The invention as set forth in claim 5, wherein the detector having the lowest bias voltage generates an alarm signal when said pulse signal is received by said detectors.

7. The invention as set forth in claim 6, wherein an indicator light is associated with each of said detectors and normally responsive to become lit upon the activation of its associated detector.

8. The invention as set forth in claim 7, wherein a memory circuit is provided in each of said detectors to maintain one or more of said activated detectors in active states without any of the indicator lights associated with said detectors becoming lit.

9. The invention as set forth in claim 8, wherein switching means are provided in said detectors to selectively render the lights associated with said detectors responsive or non-responsive without affecting the operating states of said detectors.

10. The invention as set forth in claim 9, wherein an additional detector is provided which is responsive to a tamper or fault in said signal line to produce an alarm signal.

11. A decoder circuit comprising a plurality of detector circuits, means for biasing to different bias levels to normally maintain said detector circuits inactivated, a plurality of sources for generating single pulse signals of different amplitudes, each of said sources generating a single pulse signal of an amplitude for activating a corresponding one of said detector circuits, means for applying said single pulse signals to all of said detector circuits, a single applied pulse signal from one of said sources causing a corresponding one of said detector circuits to become activated while all of the other of said detector circuits are maintained inactivated, and means to enable any one or more of said detector circuits maintained inactivated to become activated by another single pulse signal applied to all said detector circuits after the activation of said corresponding one of said detector circuits.

12. A decoder circuit as set forth in claim 11, wherein said detector circuits include indicator means to permit identification of the source, transmitting single pulse signals.

13. A decoder circuit as set forth in claim 12, wherein said detector circuits are operatively connected to each other with the applied bias levels applied to said detector circuits being in an ascending progressive order so that any applied pulse signal falls between the bias levels of two of said detector circuits.

14. A decoder circuit as set forth in claim 13, wherein the detector circuit activated produces an inhibit signal to inhibit the detector circuits having lower bias levels with the detector circuits having higher bias levels remaining inactivated.

15. The invention as set forth in claim 14, wherein a memory circuit is provided in each of said detector circuits.

* * * * *